United States Patent Office 3,484,503
Patented Dec. 16, 1969

3,484,503
BLENDS OF FLUORINATED POLYMERS
Lowell Max Magner and John Oliver Punderson, Wilmington, Del., assignors to E. I. du Pont de Nemours and Company, Wilmington, Del., a corporation of Delaware
No Drawing. Filed June 19, 1967, Ser. No. 647,237
Int. Cl. C08f 37/16
U.S. Cl. 260—900                              8 Claims

ABSTRACT OF THE DISCLOSURE

Blends of (A) 50 to 90 (preferably 70 to 80) weight percent of a copolymer of tetrafluoroethylene with 30 to 50 (preferably 35 to 45) mole percent perfluoro(alkyl vinyl ether), and (B) 10 to 50 (preferably 20 to 30) weight percent of a tetrafluoroethylene homopolymer or copolymer with up to 20 weight percent hexafluoropropene. The preferred ether is perfluoro(methyl vinyl ether).

BACKGROUND OF THE INVENTION

Field of the invention

This invention relates to blends of fluorinated polymers and, more particularly, to blends of tetrafluoroethylene polymers.

Description of the prior art

Homopolymers of tetrafluoroethylene as well as polymers thereof containing minor amounts of hexafluoropropene units are known in the art as illustrated by Brubaker, U.S. Patent 2,393,967, and Bro et al., U.S. Patent 2,946,763. While such polymers are well known to possess extraordinary resistance to high temperatures, solvents and chemicals, it would be desirable to render them easier to fabricate and extrude as well as eliminate any tendency toward porosity in shaped articles.

Copolymers of tetrafluoroethylene and perfluoro(alkyl vinyl ethers) are known and described in Harris et al., U.S. Patent 3,132,123. While such copolymers at particularly about 30 to 50 mole percent ether content exhibit good elastomeric and fabrication properties, it would be desirable to improve their flow resistance at high temperatures and strength retention on heat aging. Although blends of tetrafluoroethylene polymers are described in the prior art, such as Mallouk, U.S. Patent 3,051,683, it is desirable to get an improved combination of properties in a blend whose components are highly compatible with each other.

SUMMARY OF THE INVENTION

A blend of (A) about 50 to 90 weight percent of a copolymer of tetrafluoroethylene and an ether of the formula $CF_2=CF-O-R_f$ wherein $R_f$ is a perfluoroalkyl radical of about 1 to 3 carbon atoms, said copolymer containing about 30 to 50 mole percent ether units; and (B) about 10 to 50 weight percent of a tetrafluoroethylene homopolymer or tetrafluoroethylene polymer containing up to about 20 weight percent hexafluoropropene units and having a specific melt viscosity of about $1.5 \times 10^3$ to $1 \times 10^6$ poises.

DESCRIPTION OF PREFERRED EMBODIMENTS

One component of the blends of this invention is a copolymer of tetrafluoroethylene and perfluoro(alkyl vinyl ether) which may be represented by the formula $CF_2=CF-O-R_f$ wherein the $R_f$ is a perfluoroalkyl radical of about 1 to about 3 carbon atoms, e.g., perfluoromethyl or perfluoropropyl. Perfluoro(methyl vinyl ether) is particularly preferred. These copolymers contain from about 30 to 50 (preferably about 35 to 45) mole percent of the perfluorinated ether units. It is preferred that they have an inherent viscosity ranging from about 0.5 to 2 (measured at a 0.1% concentration in dichlorooctafluorobutane at 30° C.). These copolymers can be prepared following the general procedures disclosed in Harris et al., U.S. 3,132,123; the following specific procedure can be used:

A solution of 13.8 grams dibasic sodium phosphate ($Na_2HPO_4 \cdot 7H_2O$), 15 grams ammonium perfluorooctanoate and 4.0 grams of ammonium persulfate [$(NH_4)_2S_2O_8$] in 1886 ml. of water is put in a 1-gallon, stirred autoclave. After sealing the autoclave, the solution is heated to 40° C. and a mixture of 60 mole percent of perfluoro(methyl vinyl ether) and 40 mole percent tetrafluoroethylene is introduced into the autoclave until a pressure of 180 p.s.i.g. is attained. While the gases are being fed to the autoclave, 50 ml. of initiator solution containing 1.0 gram sodium sulfite and 4.0 mg. of copper sulfate ($CuSO_4 \cdot 5H_2O$) is added at 140 p.s.i.g. pressure. Over a period of 5 hours, the pressure is maintained at 140 p.s.i.g. using a 40 mole percent perfluoro(methyl vinyl ether)/60 mole percent tetrafluoroethylene mixture. During this time, a total of 60 ml. of initiator solution containing 1.2 g. sodium sulfite and 4.8 mg. of copper sulfate is added in increments of 5 ml. The autoclave is vented and about 2744 g. of latex is obtained. Polymer weighing about 665 g. can be isolated from the latex by freeze coagulation, followed by water washing and oven drying. Typically, the polymer will contain about 38 to 40 mole percent ether units and display an inherent viscosity of about 1.

The other component of the blend is a homopolymer of tetrafluoroethylene or a copolymer of tetrafluoroethylene containing up to about 20 weight percent hexafluoropropene units. The latter polymers have a specific melt viscosity between about $1.5 \times 10^3$ and $1 \times 10^6$ poises (preferably between about $3 \times 10^4$ and $1 \times 10^5$ poises). The term "specific melt viscosity" as used herein means the apparent melt viscosity as measured at 380° C. under a shear stress of 6.5 pounds per square inch. These values are determined using a melt indexer of the type described in American Society of Testing Materials test D–1238–52T, modified for corrosion resistance to embody a cylinder and orifice of "Ampco" aluminum bronze and a piston weighing 10 grams, having a "Stellite" cobalt-chromium-tungsten alloy tip. The resin is charged to the 0.375 inch I.D. cylinder which is held at 380° C.±0.5° C., allowed to come to an equilibrium temperature during 5 minutes, and extruded through the 0.0825 inch diameter, 0.315 inch long orifice under a piston loading of 5000 grams. The specific melt viscosity in poises is calculated as 53,150 divided by the observed extrusion rate in grams per minute.

When this component is the tetrafluoroethylene copolymer (preferably containing from about 10 to 20 percent hexafluoropropene units), it can be prepared as set forth in Bro et al., U.S. Patent 2,946,763. The tetrafluoroethylene homopolymers are normally solid, high-melting macromolecular polymers having melting points above about 325° C. These can be made by processes known to those skilled in the art, for example, Brubaker, U.S. Patent 2,393,967.

The components can be blended by mixing the aqueous dispersions of each component with a subsequent coagulation of the codispersions. Freeze coagulation or salt (magnesium chloride) coagulation can be employed. The result is an intimate mixture of separate particles. When this mixture is milled at temperatures of, for example, about 100° C., the constituent particles tend to dissolve in each other. When the second component is the tetrafluoroethylene copolymer containing up to about 20 weight percent hexafluoropropene units, one unexpectedly obtains a homogeneous, optically clear article.

When the second component is a tetrafluoroethylene homopolymer, the clarity is not quite as good because, apparently, the dissolving of particles is not as complete. On microscopic inspection, the nuclei of the polytetrafluoroethylene particles can be discerned; however, there is no discernible interface between such particles and the ether copolymer particles. Because of this tendency of the tetrafluoroethylene homopolymer to resist complete dissolving, its effect on the blend is somewhat less pronounced than an equivalent amount of the tetrafluoroethylene-hexafluoropropene copolymer. However, it should be emphasized that, even in the case of the tetrafluoroethylene homopolymer, the milled blend does not merely constitute a matrix of the ether copolymer containing trapped particles of polytetrafluoroethylene.

When the second component is the tetrafluoroethylene-hexafluoropropene copolymer described herein, it can be blended with the ether copolymer by mixing isolated particles or granules of each component on a hot mill (e.g., at 280° C. to 400° C.) until a homogeneous system is formed. This technique of blending is not ordinarily successful when the tetrafluoroethylene homopolymer is employed.

The blends are useful for a wide variety of applications; for example, they can be calendered on fabrics and molded or extruded into shaped products. These blends are characterized by being relatively easy to fabricate and extrude, but also by being resistant to flow at higher temperatures. When more than about 90% ether rubber is employed in the blend, the flow resistance at high temperatures is seriously reduced; however, when less than about 50% of the ether rubber is employed, a serious loss of elastic properties is experienced. It is found that the blends containing from about 70 to 80 weight percent of the ether copolymer are outstanding elastomers exhibiting low permanent set at break, substantial flow resistance at high temperatures, and good maintenance of strength upon prolonged heat aging.

The invention will now be described with reference to the following examples of specific embodiments thereof wherein parts and percentages are by weight unless otherwise specified.

EXAMPLE 1

Eighty-two parts by weight of a copolymer of tetrafluoroethylene and perfluoro(methyl vinyl ether), containing about 39 mole percent of the ether and having an inherent viscosity of about 0.67 (measured at a 0.1% concentration in dichlorooctafluorobutane at 30° C.), is mixed on a 2-roll mill with 18 parts of a copolymer of tetrafluoroethylene and hexafluoropropene having a melt viscosity at 380° C. of about 7 to $8 \times 10^4$ poises and containing about 15% hexafluoropropene. The tetrafluoroethylene-hexafluoropropene copolymer can be prepared, for example, by following the procedures of Example 1, U.S. Patent 2,946,763. The temperature is about 290° C. and mixing is continued until the polymer film is clear. Upon cooling to room temperature, the brownish-colored mixture has good strength and elastic, rubber-like properties, and good clarity. The mixture is remilled at about 100° C. and molded into a 0.08 inch thick slab at about 115° C. Typical stress-strain properties, measured at 25° C., are as follows:

Modulus at 100% elongation, p.s.i. _____ 550
Tensile strength at break, p.s.i. _____ 1375
Elongation at break, percent _____ 350
Permanent set at break, percent _____ 50

EXAMPLE 2

The general procedure of Example 1 is followed using 80 parts of a perfluoro(methyl vinyl ether)/tetrafluoroethylene copolymer, wherein the inherent viscosity is about 0.58, and there is about 37 mole percent of the vinyl ether present. The mixing temperature is approximately 277° C.

The following properties are typical (at 25° C.):

Tensile strength at break, p.s.i. _____ 1640
Elongation at break, percent _____ 240
Permanent set at break, percent _____ 20
Brittle temperature, ° C. _____ −41

Percent weight increase after 10 days immersion:

Hydrazine hydrate _____ 0.40
Diethyl amine _____ 0.61
Conc. $H_2SO_4$ _____ 0.16
20% aqueous KOH _____ 0.38
90% fuming $HNO_3$ _____ 0.75
Dimethylformamide _____ 0.34
Ethyl acetate _____ 0.56

EXAMPLE 3

A copolymer of tetrafluoroethylene and perfluoro(methyl vinyl ether) is prepared and used as an aqueous latex. The copolymer in the latex has an inherent viscosity of 1.1 and contains about 39 mole percent ether units. This latex is blended by rapidly stirring it with an aqueous dispersion of a tetrafluoroethylene/hexafluoropropene copolymer of Example 1 or a tetrafluoroethylene homopolymer. The proportions of latex used are sufficient to produce the polymer compositions shown in the table. After mixing, the mixed solids are isolated from the water by freezing to coagulate, then washing several times with water and drying in a circulating air oven at about 110° C. The mixtures are then milled at about 100° C. and molded into slabs at about 150° C.

TABLE

| | | | | |
|---|---|---|---|---|
| Tetrafluoroethylene/perfluoro(methyl vinyl ether) copolymer | 75 | 50 | 75 | 50 |
| Tetrafluoroethylene/hexafluoropropene copolymer | 25 | 50 | | |
| Tetrafluoroethylene homopolymer | | | 25 | 50 |
| Stress-strain properties measured at 25° C.: | | | | |
| Modulus at 100% elongation, p.s.i. | 590 | 935 | 930 | 1,010 |
| Tensile strength at break, p.s.i. | 1,785 | 1,120 | 1,740 | 1,525 |
| Permanent set at break, percent | 38 | 26 | 21 | 21 |
| Properties measured after heating the mixture in air for 7 days at 316° C. and remilling and molding: | | | | |
| Percent wt. loss during heat treatment | 3.6 | 4.8 | 3.8 | 2.9 |
| Modulus at 100% elongation, p.s.i. | 560 | 1,070 | 770 | |
| Tensile strength at break, p.s.i. | 190 | 1,675 | 585 | 1,860 |
| Elongation at break, percent | >1,000 | 370 | 110 | 20 |
| Permanent set at break, percent | 88 | 315 | 32 | 1 |

Copolymers of tetrafluoroethylene can be prepared with other perfluoroalkyl ethers, e.g., perfluoro(propyl vinyl ethers), and substituted in the above examples to make the blends of this invention.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

We claim:

1. A blend of (A) about 50 to 90 weight percent of a copolymer of tetrafluoroethylene and an ether of the formula $CF_2$=CF—O—$R_f$ wherein $R_f$ is a perfluoroalkyl radical of about 1 to 3 carbon atoms, said copolymer containing about 30 to 50 mole percent ether units; and (B) about 10 to 50 weight percent of a tetrafluoroethylene homopolymer or copolymer with up to about 20 weight percent hexafluoropropene units and having a specific melt viscosity of about $1.5 \times 10^3$ to $1 \times 10^6$ poises.

2. A blend as defined in claim 1 wherein the amount of copolymer (A) is from 70 to 80 weight percent and the amount of polymer (B) is from 20 to 30 percent.

3. A blend as defined in claim 1 wherein the amount of said ether in said copolymer (A) is from 35 to 45 mole percent.

4. A blend as defined in claim 1 wherein said $R_f$ radical is perfluoromethyl.

5. A blend as defined in claim 1 wherein said specific melt viscosity range is from about $3 \times 10^4$ to $1 \times 10^5$ poises.

6. A blend as defined in claim 1 wherein said polymer (B) contains from about 10 to 20 percent hexafluoropropene units.

7. A blend as defined in claim 1 wherein said polymer (B) is a tetrafluoroethylene homopolymer.

8. A blend of (A) about 70 to 80 weight percent of an elastomeric copolymer of about 55 to 65 mole percent tetrafluoroethylene and about 35 to 45 mole percent perfluoro(methyl vinyl ether); and (B) about 20 to 30 weight percent of a tetrafluoroethylene copolymer with up to about 20 weight percent hexafluoropropene units, the specific melt viscosity of said polymer being about $3 \times 10^4$ to $1 \times 10^5$ poises.

References Cited

UNITED STATES PATENTS 3,400,065  9/1968  Barth _____ 204—159.2

MURRAY TILLMAN, Primary Examiner

C. J. SECCURO, Assistant Examiner